United States Patent
Trygg et al.

(10) Patent No.: US 7,347,423 B2
(45) Date of Patent: Mar. 25, 2008

(54) ARRANGEMENT IN CONNECTION WITH MECHANICAL SEAL

(75) Inventors: Hannu Trygg, Muurame (FI); Esa Salovaara, Muurame (FI)

(73) Assignee: Safematic Oy, Muurame (FI)

( * ) Notice: Subject to any disclaimer, the term of this patent is extended or adjusted under 35 U.S.C. 154(b) by 10 days.

(21) Appl. No.: 10/475,799

(22) PCT Filed: Apr. 26, 2002

(86) PCT No.: PCT/FI02/00361

§ 371 (c)(1), (2), (4) Date: Mar. 8, 2004

(87) PCT Pub. No.: WO02/088553

PCT Pub. Date: Nov. 7, 2002

(65) Prior Publication Data

US 2004/0155409 A1 Aug. 12, 2004

(30) Foreign Application Priority Data

Apr. 27, 2001 (FI) .................................. 20010893

(51) Int. Cl.
- *F16J 15/34* (2006.01)
- *F16J 15/40* (2006.01)
- *F01D 11/04* (2006.01)

(52) U.S. Cl. ...................... 277/358; 277/304; 137/468; 137/79

(58) Field of Classification Search ................ 277/304, 277/358; 137/79, 468
See application file for complete search history.

(56) References Cited

U.S. PATENT DOCUMENTS

| | | | | |
|---|---|---|---|---|
| 3,687,290 | A | * | 8/1972 | Myers ........................ 210/149 |
| 3,700,247 | A | | 10/1972 | Butler et al. |
| 3,895,646 | A | * | 7/1975 | Howat ......................... 137/468 |
| 3,968,969 | A | * | 7/1976 | Mayer et al. ................ 277/408 |
| 4,227,646 | A | * | 10/1980 | Hart et al. ................. 236/93 R |
| 4,549,717 | A | * | 10/1985 | Dewaegheneire ............ 137/79 |
| 4,558,870 | A | | 12/1985 | Martinez |
| 4,699,171 | A | * | 10/1987 | Sugden ....................... 137/468 |
| 4,813,608 | A | * | 3/1989 | Holowach et al. ..... 239/265.37 |

(Continued)

FOREIGN PATENT DOCUMENTS

DE     3537 147 A1    4/1987

(Continued)

*Primary Examiner*—Katherine Mitchell
(74) *Attorney, Agent, or Firm*—Barnes & Thornburg, LLP

(57) ABSTRACT

An arrangement in connection with a mechanical seal includes at least two sliding surfaces pressing against each other, which are arranged to seal a gap between a rotating and a non-rotating machining part, and mechanism for providing a sealing fluid flow cooling the sliding surfaces. To provide an optimal consumption of sealing fluid, a valve mechanism is arranged to the mechanism for providing the cooling sealing fluid flow, the valve mechanism being arranged to react to the temperature of the seal and to open and close the flow of sealing fluid according to the cooling need.

4 Claims, 4 Drawing Sheets

U.S. PATENT DOCUMENTS

Figures 5, 6:
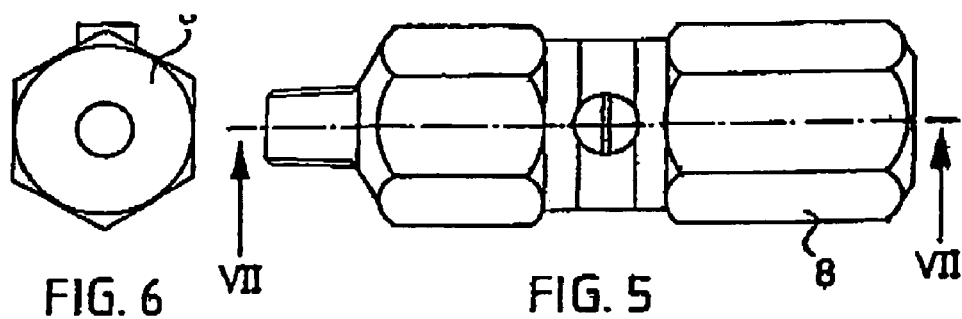

| | | | |
|---|---|---|---|
| 4,969,796 A | | 11/1990 | Wescott et al. |
| 5,188,145 A | * | 2/1993 | Mathieu ..................... 137/340 |
| 5,226,683 A | * | 7/1993 | Julien et al. ................ 285/363 |
| 5,261,597 A | * | 11/1993 | Perlman et al. ........... 236/93 R |
| 5,397,053 A | * | 3/1995 | Ewing et al. ............. 236/93 B |
| 5,421,892 A | | 6/1995 | Miyagi |
| 5,511,576 A | * | 4/1996 | Borland ....................... 137/72 |
| 5,632,297 A | * | 5/1997 | Sciullo et al. ................ 137/73 |
| 6,125,800 A | * | 10/2000 | Lugs ...................... 123/41.54 |
| 6,276,312 B1 | * | 8/2001 | Summan et al. ......... 123/41.54 |
| 6,296,012 B1 | | 10/2001 | Kilgore et al. |
| 6,644,667 B2 | * | 11/2003 | Grondahl .................... 277/355 |
| 2002/0074418 A1 | * | 6/2002 | Smith ......................... 236/87 |
| 2003/0188949 A1 | * | 10/2003 | Porter .................... 192/103 F |
| 2004/0150165 A1 | * | 8/2004 | Grondahl .................... 277/355 |

FOREIGN PATENT DOCUMENTS

| | | | |
|---|---|---|---|
| EP | 0 283 080 A1 | | 9/1998 |
| FI | 64450 | | 11/1983 |
| JP | 58-057573 | | 4/1983 |
| JP | 58-121378 | | 7/1983 |
| JP | 58-184367 | | 10/1983 |
| JP | 62-177372 | | 8/1987 |
| JP | 01015598 A | * | 1/1989 |
| NL | EP 0283080 | * | 9/1988 |
| WO | WO 98/54469 | | 12/1998 |

* cited by examiner

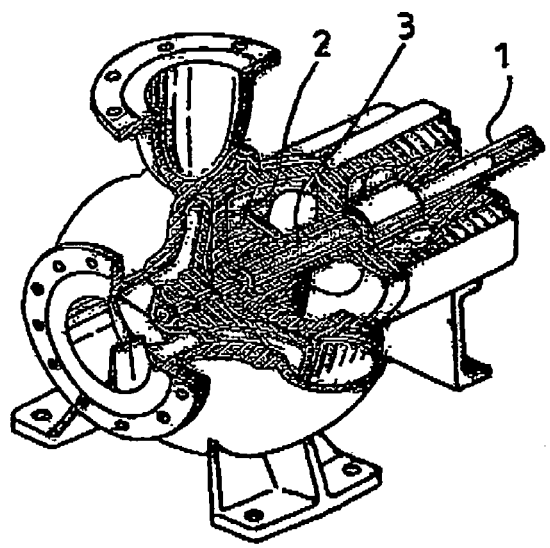
FIG. 1
PRIOR ART
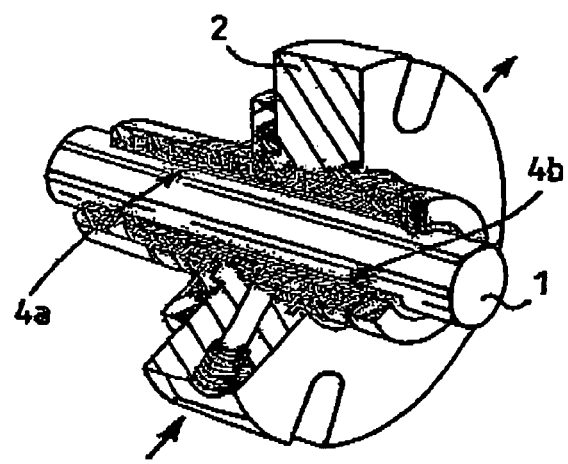
FIG. 2
PRIOR ART
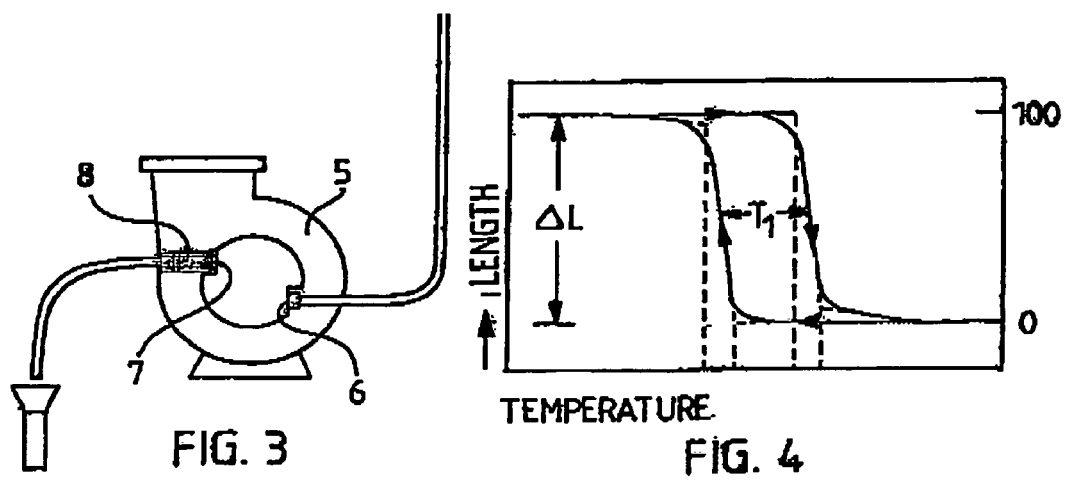
FIG. 3
FIG. 4

ARRANGEMENT IN CONNECTION WITH MECHANICAL SEAL

This is the National Stage of International Application No. PCT/FI02/00361, which was filed in English on Apr. 22, 2002 and designated the U.S.

The invention relates to an arrangement in connection with a mechanical seal that comprises two sliding surfaces pressing against each other, which are arranged to seal a gap between a rotating and a non-rotating machine part, and means for providing a sealing fluid flow cooling the sliding surfaces.

Mechanical seals are commonly used in different technical fields to seal gaps between a rotating and a non-rotating machine part. Examples of such rotating and non-rotating machine parts and gaps between them include the body and shaft of a pump, for instance process pump, and the gap between them that needs to be sealed so that the pumped process fluid cannot leak out through the gap between the pump shaft and the pump body. The sealing is done between two exactly opposing sliding surfaces that rotate against each other. In normal use, a mechanical seal naturally also heats up, in which case it is cooled by a fluid flow on the opposing side to the seal. Water, for instance, is used as the coolant. Mechanical seals often also contain a second sliding surface pair on the atmospheric side, in other words on the outside, to seal any leakage of sealing fluid to the atmosphere.

Critical operating values in the operation of a mechanical rotary shaft seal include pressure, temperature and a few other factors. Pressure includes the pressure of the sealed product, the pressure inside the seal, or the sealing fluid pressure, the ratio of the above-mentioned pressures with respect to each other, and any changes occurring in the pressures.

As regards temperature, the related issues are the temperature of the sealed product, the temperature of sealing fluid, the temperature of the environment, the temperature of the parts of the seal, especially the sliding surfaces, and any changes in temperature.

Other factors include the rotation rate of the sealed shaft, the start-ups and shutdowns of the process, and possible malfunctions.

The prior art includes the following examples, for instance. Mechanical rotary shaft seals use double balancing to enable the seal to adjust to changing pressures, if the change takes place slowly. FI application 773,726 discloses a solution of this kind.

Mechanical rotary shaft seals are cooled by means of a sealing fluid that flows continuously through them. The flow is in some cases limited, i.e. the flow is adjusted in such a manner that cooling is sufficient for the conditions prevailing during the adjustment. In some cases, the water connection from the seal is plugged completely. These solutions use a sealing water adjustment and control unit, for instance, to adjust the flow and pressure of the sealing water of the mechanical seal. The apparatus comprises a flow meter and any necessary adjustment devices for adjusting the flow and pressure of the sealing water. The flow rate of sealing water is determined using the above-mentioned arrangement. One important task of the sealing water is to cool the mechanical seal, as stated above. It is, however, difficult to adjust the flow of the sealing water to be optimal according to the temperature of the outflowing sealing water. The above-mentioned solution helps find out the amount of used sealing water, but, for safety, water consumption is often adjusted to be too high. Further, there is the problem that if the flow of the sealing water is adjusted to be low, the flow orifice is easily blocked by particles in the water, even though the orifice were designed to allow water impurities to pass. Flow low-limit alerts caused by orifice blockage are also problematic in practice. Plugging the sealing water outflow connection provides good conditions for a mechanical seal, but this arrangement does not provide heat removal from the seal. If the temperature rises higher than the temperature designed for a mechanical seal, the seal may suffer damage. The solution is thus not suitable for situations, in which the temperature of the seal rises easily. An advantage of the solution is naturally that it does not waste expensive sealing water.

As regards the prior art, it can be said that rapid pressure changes may cause damage to the seal. In addition, it should be noted that using continuous flow consumes large amounts of sealing fluid. Continuous flow also does not take into consideration the actual cooling need of the seal and changes in it, which may lead to seal damage. Oversized sealing fluid flow also cools the sealed product, which causes problems. If the flow of sealing fluid is completely stopped, the risk of damage to the seal increases. Changes in rotation rate affect the cooling need of the seal, and the known solutions do not adapt to these changes. During start-ups and shutdowns of the process, changes in the pressures and temperatures are common. The known solutions do not adapt to these changes. When the process is shut down, continuous-flow cooling uses sealing fluid, even though the seal does not require cooling. The known solutions are also insensitive to changes occurring in the process and the surroundings, which may lead to seal damage.

It is an object of the invention to provide an arrangement, by means of which it is possible to eliminate the drawbacks of the prior art. This is achieved by the arrangement of the invention. The arrangement of the invention is characterized in that a valve means is arranged in connection with the means providing a cooling sealing fluid flow, the valve means being arranged to react to the temperature of the seal and to open and close the sealing fluid flow according to the cooling need.

An advantage of the invention is, above all, that by means of the invention the seal can be made to adapt to all changes in the sealed product, sealing fluid and surroundings, in other words both pressure changes and temperature changes. By means of the invention, the cooling of the seal can also be optimized to correspond to the actual situation, thereby saving considerable amounts of sealing fluid. A further advantage is that the product is not cooled unnecessarily. Optimization provides conditions for the seal, in which its service life can be made as long as possible and the risk for seal damage lower than before. The invention further provides reaction to the changes in the cooling need caused by a change in the rotation rate, which the known solutions are incapable of. Due to the invention, sealing fluid is not used in vain when the process is shut down. Due to the invention, the seal is capable of reacting to quickly occurring changes and malfunctions.

Figure 7:
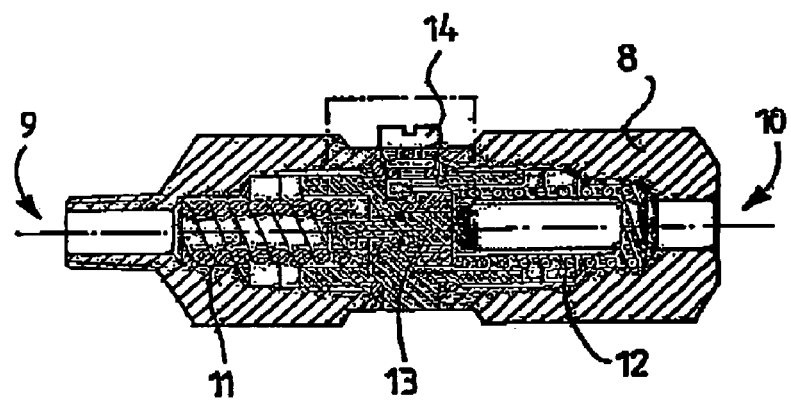
Figure 8:
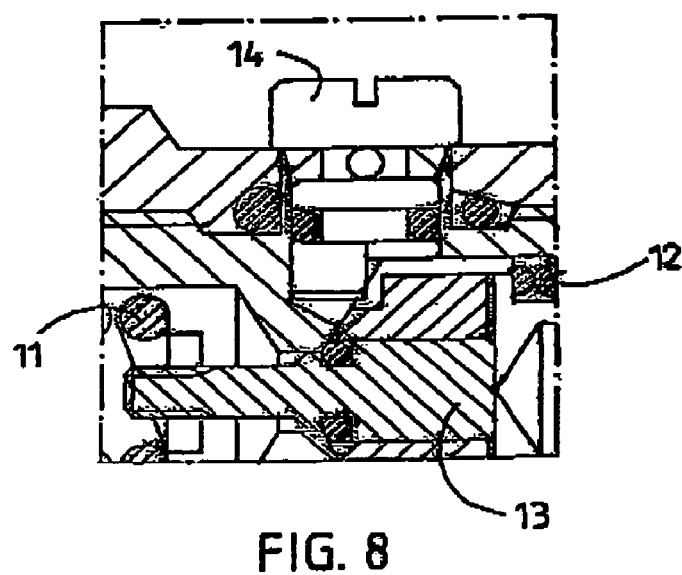
Figure 9:
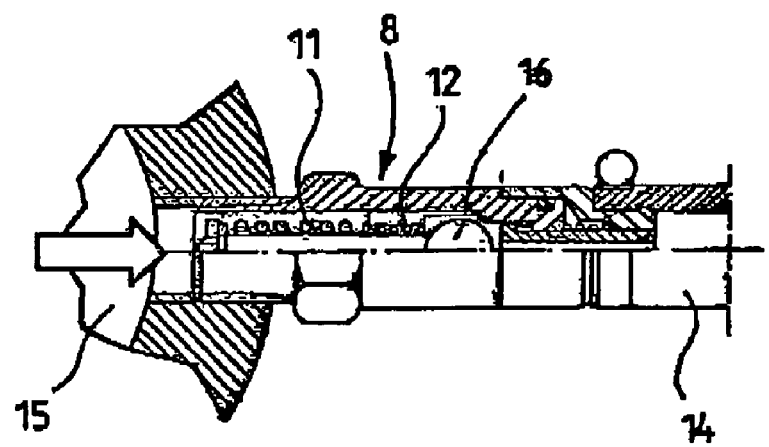
Figure 10:
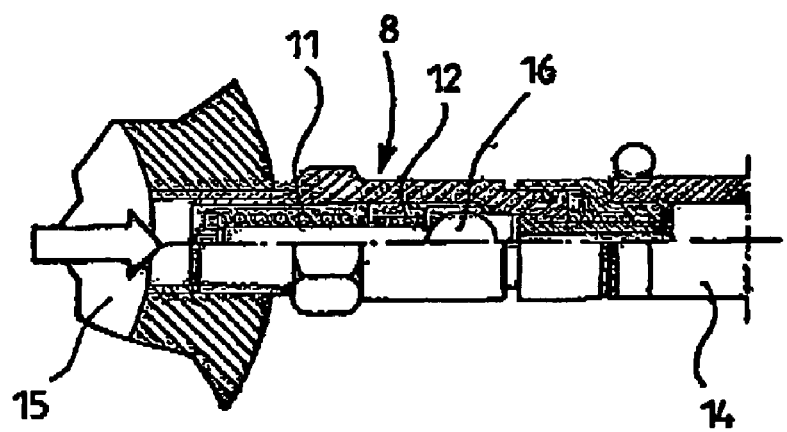
Figure 11:
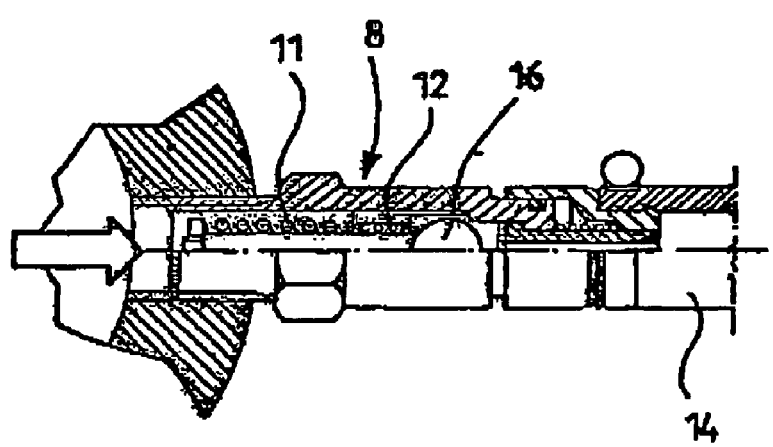

In the following, the invention will be described in greater detail by means of a preferred embodiment described in the attached drawing, in which FIG. 1 is a general view of a process pump, FIG. 2 is a general view of a detail of FIG. 1 on a larger scale, FIG. 3 is a general view of the basic principle of the arrangement of the invention, FIG. 4 is a schematic representation of the principle of the thermal expansion of memory metal, FIG. 5 is a side view of an essential part of the arrangement of the invention, FIG. 6 shows the part of FIG. 5 seen from the flow direction, FIG. 7 is a cutaway view of the part of FIG. 5 shown by arrows along VII-VII, FIG. 8 is a view of the detail of FIG. 7 on a larger scale, and FIGS. 9 to 11 are cutaway side views of a second embodiment of the arrangement of the invention in various operating phases.

Figure 12:
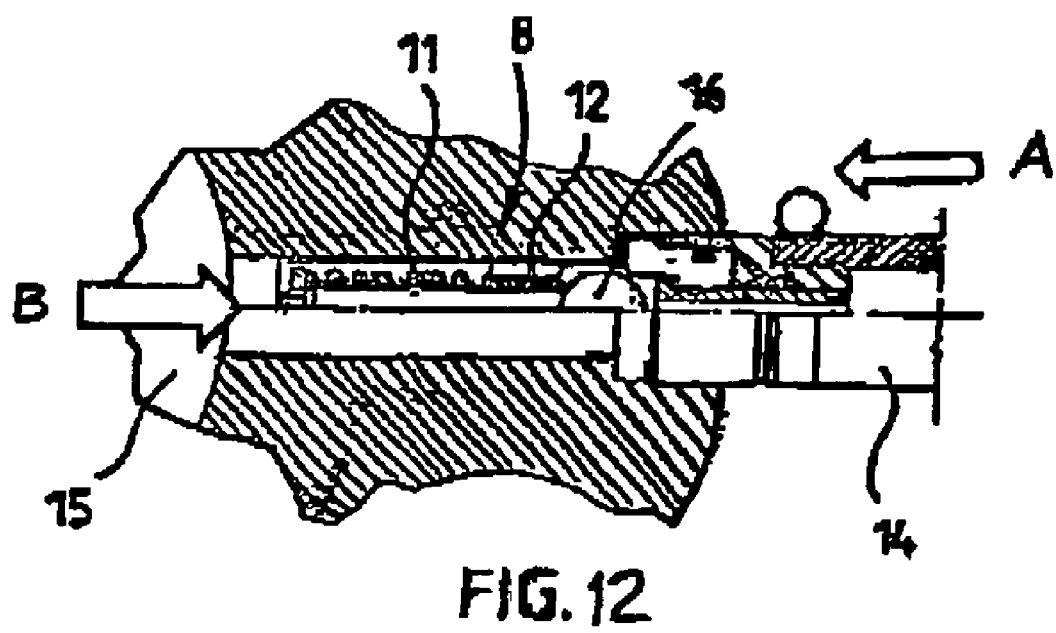

FIG. 12 illustrates the integral nature of the valve means and the seal.

FIG. 1 is a general view of a process pump having a mechanical seal arranged between a rotating part 1 and a non-rotating part 2 to seal the gap between the rotating part 1 and the non-rotating part 2 at location 3. The above-mentioned mechanical seal is shown on a larger scale in FIG. 2.

The mechanical seal comprises two sliding surfaces pressing against each other, which are arranged to seal the gap between the rotating and the non-rotating machine part. The seal further comprises an input unit and an output unit for directing cooling sealing fluid to and from the mechanical seal. The seal may also comprise a second sliding surface pair to seal any leakage of sealing fluid to the surroundings. The input and output of sealing fluid to and from the seal is shown in general by means of arrows in FIG. 2. The sealing sliding surface pairs are marked by reference numerals 4a and 4b in FIG. 2.

The above matters are known to a person skilled in the art and are thus not described in more detail in this context. The seal structure can for instance be a double-balanced mechanical rotary shaft seal as described in FI application 773,726, which can be optimized for pressure.

FIG. 3 shows the basic principle of the invention. Reference numeral 5 shows a pump. Reference numeral 6 shows an input unit of sealing fluid and reference numeral 7 an output unit of sealing fluid. According to the essential idea of the invention, a valve means is arranged in connection with the means that provide the flow of sealing fluid, for instance in connection with the output unit 7 of sealing fluid, the valve means being arranged to react to the temperature of the seal and to open and close the flow of sealing fluid according to the cooling need of the seal. The valve is thus arranged to operate in such a manner that it opens and closes the flow of sealing fluid according to the cooling need. If the seal does not require cooling, the valve does not open at all. By means of the above-mentioned function, the arrangement operates at varying temperatures. A throttle in the valve prevents rapid pressure changes.

The solution can be implemented in different ways, for instance mechanically and electrically. A mechanical valve means can for instance contain a part 11 made of memory metal, whereby the valve means 8 is arranged to open when the temperature of sealing fluid rises to the temperature limit activated in the memory metal in the valve means and, correspondingly, to close when the temperature of sealing fluid decreases.

The valve means 8 can be connected in the manner shown in FIG. 3 to the output unit 7 of sealing fluid. If the temperature of the seal is low, in other words, if no heat removal is needed, the valve means 8 is closed and sealing fluid cannot flow through the valve means 8. When the seal temperature rises, the temperature of sealing fluid naturally also rises correspondingly. When the temperature rises close to a critical level for the operation of the mechanical seal, the valve means 8 opens and sealing fluid flows through the sealing space until the temperature goes down again. After the temperature has gone down, the valve means 8 closes. The above-mentioned operation is in the invention achieved by means of the properties of memory metal.

As described above, the essential idea of the arrangement of the invention is that the arrangement prevents the rise of the temperature above the critical level for the operation of the seal. Memory metal is used in the valve means, and the seal manufacturer determines the temperature limit of the memory metal activated during manufacturing, in other words, the above-mentioned temperature limit is defined to correspond to the critical temperature for the operation of the seal mentioned earlier. Memory metal does not behave linearly according to the principle of thermal expansion, but according to FIG. 4.

FIGS. 6 to 8 show in detail a preferred embodiment of the valve means of the arrangement according to the invention. In the figures, reference numeral 9 marks a connection to the output unit of sealing fluid, through which sealing fluid flows into the valve means 8. Reference numeral 10 marks the unit, through which sealing fluid flows out of the valve means. Reference numeral 11 marks the part made of memory metal. Reference numeral 12 marks a release spring and reference numeral 13 a seat valve. Reference numeral 14 marks a manual control valve used in venting and testing the device.

The valve means 8 shown in FIGS. 5 to 8 operates as follows. When the temperature rises in the connection 9 to the temperature limit activated in the memory metal 11, the seat valve 13 opens, in other words, the part 11 made of memory metal expands rapidly and pushes the seat valve 13 open against the force of the release spring 12. Sealing fluid can then flow through the valve means 8 and on through the unit 10 out to the output unit 7 shown in FIG. 3. The flow-through openings of the seat valve 13 are designed large enough to prevent the impurities in sealing fluid from blocking the valve. The seat valve opens very quickly, thus preventing any impurities from remaining in the valve. The valve is either closed or completely open. The rapid operation of the valve is based on the behaviour of memory metal when the temperature changes, as shown in FIG. 4. When the temperature of sealing fluid decreases, the part 11 made of memory metal contracts and the force that keeps the seat valve open becomes weaker and the release spring 12 closes the seat valve 13.

FIGS. 9 to 11 show a second example of a mechanical application. The embodiment according to FIGS. 9 to 11 is of similar type as that of FIGS. 6 to 8. In FIGS. 9 to 11, same reference numerals are used for corresponding details as in FIGS. 6 to 8.

The embodiment of FIGS. 9 to 11 operates in principle as follows. When received, the valve is vented and tested as follows. The hose 14 is pressed in the direction indicated by arrow A to bleed air out of the water space 15 of the mechanical seal and water flows through the valve in the direction indicated by arrow B. When the hose 14 is released, the valve closes by means of the sealing water pressure and the release spring 12. The structure and operation of the venting mechanism is known per se to a person skilled in the art, so it will not be described in greater detail in this context.

When the temperature rises in the seal close to the maximum operating temperature, the part 11 made of memory metal, such as a spring, is activated and opens the valve. Cold water then flows to the water space 15 of the seal, the temperature decreases, the springback force of the spring 11 made of memory metal decreases and the valve closes, in other words, the valve returns to its normal position, in which the sealing water pressure and the release spring 12 close the valve by means of a ball 16 serving as a closing part.

An electrical application can be implemented for instance by using an electrically operated solenoid valve controlled by a temperature sensor. The solenoid valve is mounted externally to the mechanical rotary shaft seal in such a manner that the sensor measures the temperature of sealing fluid and opens the solenoid valve when necessary.

All above-mentioned alternatives provide the same function, i.e. the active temperature optimization of the operation of a mechanical seal. As stated earlier, the double-balanced seal solution described in FI application 773,726 can for instance be used for pressure optimisation.

The embodiments described above are in no way intended to limit the invention, and the invention can be modified freely within the scope of the claims. Thus, it is clear that the arrangement of the invention or its details need not necessarily be exactly as shown in the figures, and other kinds of solutions are possible. For instance, the valve means need not be a separate component, and it can also be integrated to the mechanical seal as illustrated in FIG. 12.

The invention claimed is:

1. A method of controlling sealing fluid flow according to seal cooling need, comprising:
   providing at least two sliding surfaces pressing against each other, which are arranged to seal a gap between a rotating and a non-rotating machine part,
   providing means for providing a sealing fluid flow cooling the sliding surfaces, and
   providing a valve means arranged in connection with the means for providing a cooling sealing fluid flow, the operation of the valve means being based on a memory metal element that is arranged to react to the temperature of the sealing fluid and to open and close the sealing fluid flow according to a cooling need, wherein the valve means is integrated to the mechanical seal.

2. The method of claim 1, wherein the valve means contains a part made of memory metal and that the valve means is arranged to open when the temperature of sealing fluid rises to the temperature limit activated in the memory metal in the valve means and, correspondingly, to close when the temperature of sealing fluid decreases.

3. The method of claim 2, wherein the valve means comprises a seat valve, in which the part made of memory metal is arranged to move a closing part against the force exerted by a release spring or a release spring and sealing fluid pressure.

4. The method of claim 3, wherein the closing part is a ball.

* * * * *